United States Patent [19]

Hyodo et al.

[11] Patent Number: 4,674,856

[45] Date of Patent: Jun. 23, 1987

[54] IMAGE FORMATION APPARATUS

[75] Inventors: Haruhiro Hyodo, Toyohashi; Masayuki Mino, Toyokawa, both of Japan

[73] Assignee: Minolta Camera Kabushiki Kaisha, Osaka, Japan

[21] Appl. No.: 867,767

[22] Filed: May 28, 1986

[30] Foreign Application Priority Data

May 29, 1985 [JP] Japan .................................. 60-117330

[51] Int. Cl.$^4$ ...................... G03B 27/00; G03B 27/48; G03B 27/50
[52] U.S. Cl. ......................................... 355/1; 355/8; 355/51; 355/65
[58] Field of Search ............................ 355/1, 51, 65, 8

[56] References Cited

U.S. PATENT DOCUMENTS

| | | | |
|---|---|---|---|
| 3,687,545 | 8/1972 | Moorhusen | 355/65 |
| 3,992,093 | 11/1976 | Jakobson | 355/51 |
| 4,129,373 | 12/1978 | Ogura et al. | 355/1 |
| 4,420,245 | 12/1983 | Katao | 355/1 X |

Primary Examiner—Richard A. Wintercorn
Attorney, Agent, or Firm—Price, Gess & Ubell

[57] ABSTRACT

The disclosure is directed to an image formation apparatus for producing both mirror images and normal images. The apparatus comprises an image inverting prism positionable selectively in an optical path of an image transmission device or outside thereof. The prism is so shaped as to give the same optical path length when positioned in the optical path and when positioned otherwise.

16 Claims, 9 Drawing Figures

IMAGE FORMATION APPARATUS

FIELD OF THE INVENTION

The present invention relates to an image formation apparatus, and more particularly to an image formation apparatus comprising an image transmission device having an image inverting prism which is movable into or out of the optical path.

BACKGROUND OF THE INVENTION

Electrophotographic copying machines appear useful for preparing offset printing plates by a simple method. However, the offset printing plates need to bear mirror images, whereas usual electrophotographic copying machines produce normal images only.

On the other hand, although it is possible to design a copying machine specifically for preparing offset printing plates only, the machine will predominantly be of the same construction as copying machines for producing usual copies, so that it is inefficient to prepare a copying machine for offset printing plates and a copying machine for usual copies.

SUMMARY OF THE INVENTION

Accordingly, the main object of the present invention is to provide an image formation apparatus capable of producing both offset printing plates and usual copies.

Another object of the present invention is to provide an image formation apparatus which comprises a compact image transmission device and by which a normal image or mirror image can be obtained selectively.

These and other objects can be fulfilled by an image formation apparatus comprising a reciprocatingly movable platen for placing an original thereon, a photosensitive member for forming an image of the original thereon and an image transmission device for transmitting the image of the original onto the photosensitive member, the apparatus being characterized in that the image transmission device has an array of minute lens elements and an image inverting prism positionable selectively in the optical path of the array or outside thereof, the prism being so shaped as to give the same optical path length when positioned in the optical path and when positioned otherwise, the apparatus further comprising control means for controlling the movement of the prism into or out of the optical path and reversing the direction of movement of the platen for image formation in accordance with the movement of the prism into or out of the optical path.

More specifically, the array of minute lens elements is an array of light transmission fibers of graded refractive indexes.

More specifically, the image inverting prism has a surface of incidence and a surface of emergence which are vertical to the optical axis, first and third reflecting surfaces which are inclined with respect to the optical axis and a second reflecting surface parallel to the optical axis. The angle between the surface of incidence and the first reflecting surface is equal to the angle between the surface of emergence and the third reflecting surface. The rays incident on the surface of incidence are reflected inside the prism at the first, second and third reflecting surfaces in the order mentioned and emerge from the surface of emergence.

BRIEF DESCRIPTION OF THE DRAWINGS

These and other objects or features of the present invention will become apparent from the following description of a preferred embodiment thereof taken in conjunction with the accompanying drawings, in which.

DESCRIPTION OF THE PREFERRED EMBODIMENT

In the following description, like parts are designated by like reference numbers throughout the several drawings.

Figure 1:
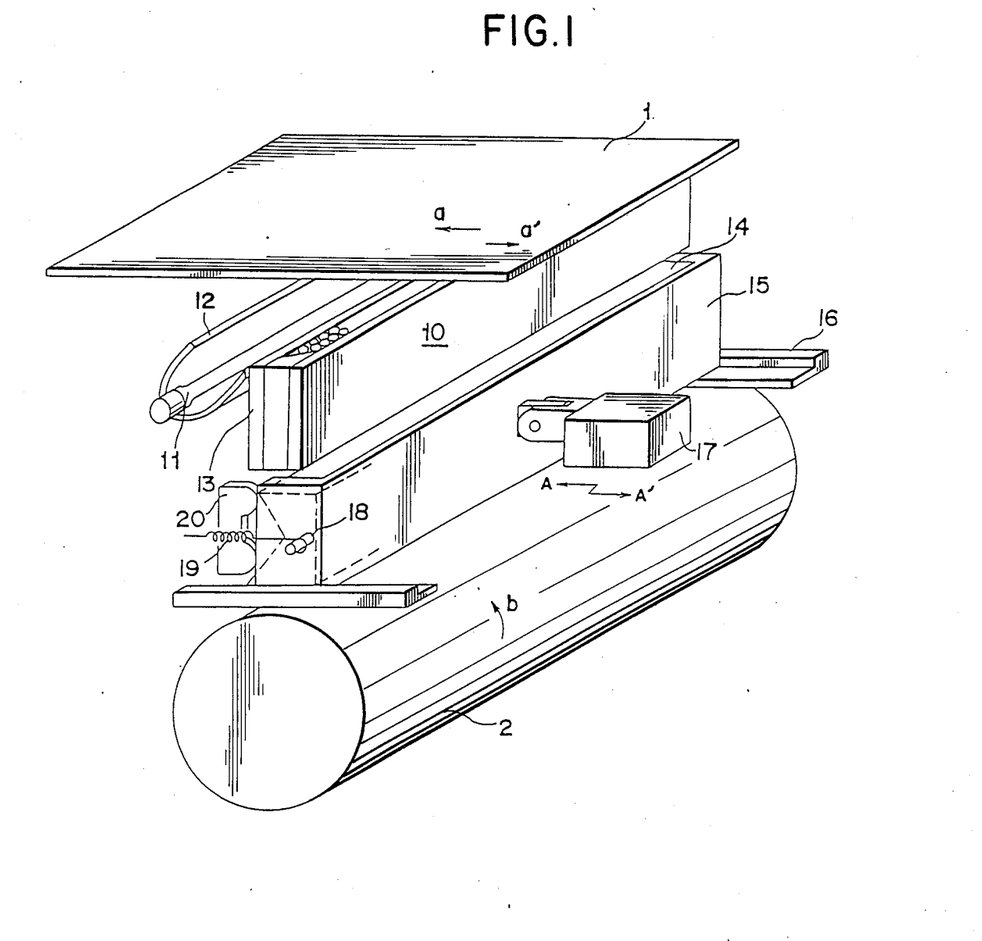
FIG. 1 is a fragmentary perspective view showing an image formation apparatus of the present invention.

With reference to FIG. 1 schematically showing an image formation apparatus embodying the present invention, a reciprocatingly movable glass platen 1 is provided at the top of the apparatus. A photosensitive drum 2, rotatable in the direction of arrow b, is disposed below the glass platen 1. An image transmission device 10 is interposed between the platen and the drum. Arranged around the drum 2 are unillustrated image forming elements which are already known for use in common electrophotographic copying machines and therefore will not be described. An image formed by these elements and the image transmission device 10 is transferred to paper to make a copy.

The image transmission device 10 comprises a lamp 11 provided with a reflecting mirror 12, an array 10 of light transmission fibers of graded refractive indexes and an image inverting prism 14.

The lamp 11 is adapted to project a beam of rays as converged by the reflecting mirror 12 on the rear surface of the glass platen 1 as if through a slit. An original placed on the glass platen 1 is irradiated from portion to portion with the light in the form of a slit and emitted by the lamp 11 with the travel of the glass platen 1 in the direction of arrow a or a′.

The array 13 is composed of a multiplicity of light transmission fibers of graded refractive indexes arranged in parallel and is disposed between the glass platen 1 and the drum 2 for guiding the reflected light from the original on the platen 1 onto the drum 2 to form an image of the original. At this time, the drum 2 is of course drivingly rotated in the direction of arrow b at a peripheral speed equal to the speed of the glass platen 1.

The image inverting prism 14 is supported by a holder 15, disposed between the array 13 and the drum 2 and is movable into or out of the optical path therebetween. The holder 15 is supported at its opposite ends by guide rails 16, 16 fixed to the machine main body and is slidable in the directions of arrows A and A′. A solenoid 17 is connected to the rear side of the holder 15 centrally thereof. On the other hand, the holder 15 is always biased in the direction of arrow A by a spring 19 attached at its one end to a pin 18 on one end of the holder 15 and is restrained in position by the contact of the front side of the holder end with a positioning member 20 fixed to the machine main body. Although not shown in FIG. 1, like spring 19 and positioning member 20 are provided also at the other end of the holder 15.

Accordingly, when the solenoid 17 is deenergized, the prism 14 is urged by the springs 19 in the direction of arrow A and restrained in position by the positioning members 20, whereby the prism 14 is positioned in the optical path of the image transmission device 10. When energized, on the other hand, the solenoid 17 slidingly retracts the prism 14 from the optical path in the direction of arrow A'.

Formation of images will be described with reference to FIGS. 2 and 3. In these drawings, indicated at X is the image of an original, at Y a corresponding image formed by exposure, at 21 an object surface and at 22 an image surface.

Figure 2:
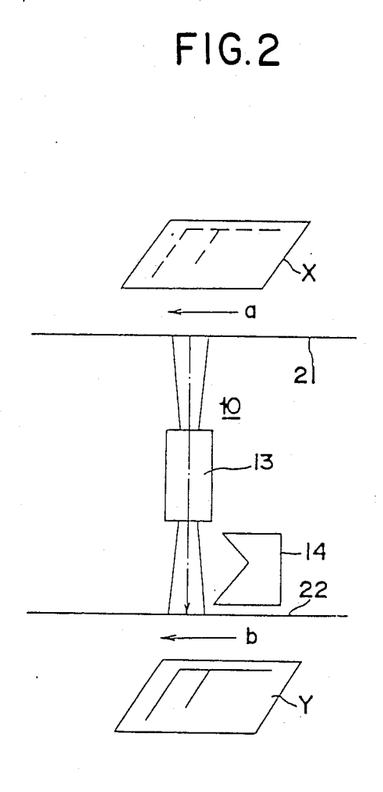
FIGS. 2 and 3 are diagrams illustrating the image formation apparatus in condition for forming a normal image and a mirror image, respectively.
Figure 3:
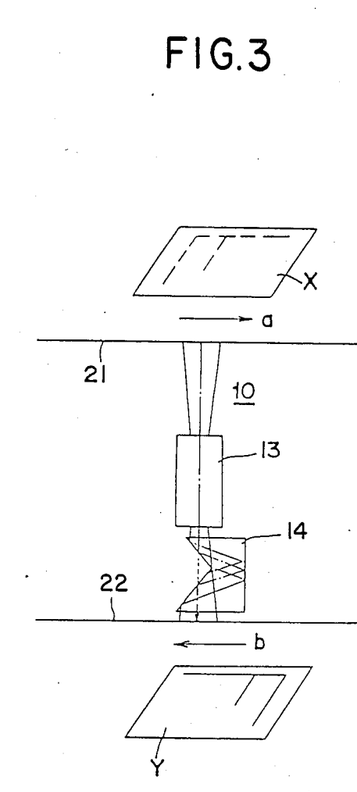

To obtain a normal image (for making a usual copy), the drum 2 is exposed to light after retracting the image inverting prism 14 from the optical path by energizing the solenoid 17 (see FIG. 2). When a mirror image is to be obtained (for preparing an offset printing plate), the prism 14 is advanced into the optical path by deenergizing the solenoid 17, and the drum is then exposed to light for image formation (see FIG. 3). When the direction of rotation of the drum is that of arrow b and unchanged in this case, the glass platen 1 is moved in the direction of arrow a when normal images are to be formed, or in the direction of arrow a' when mirror images are to be formed.

Figure 4:
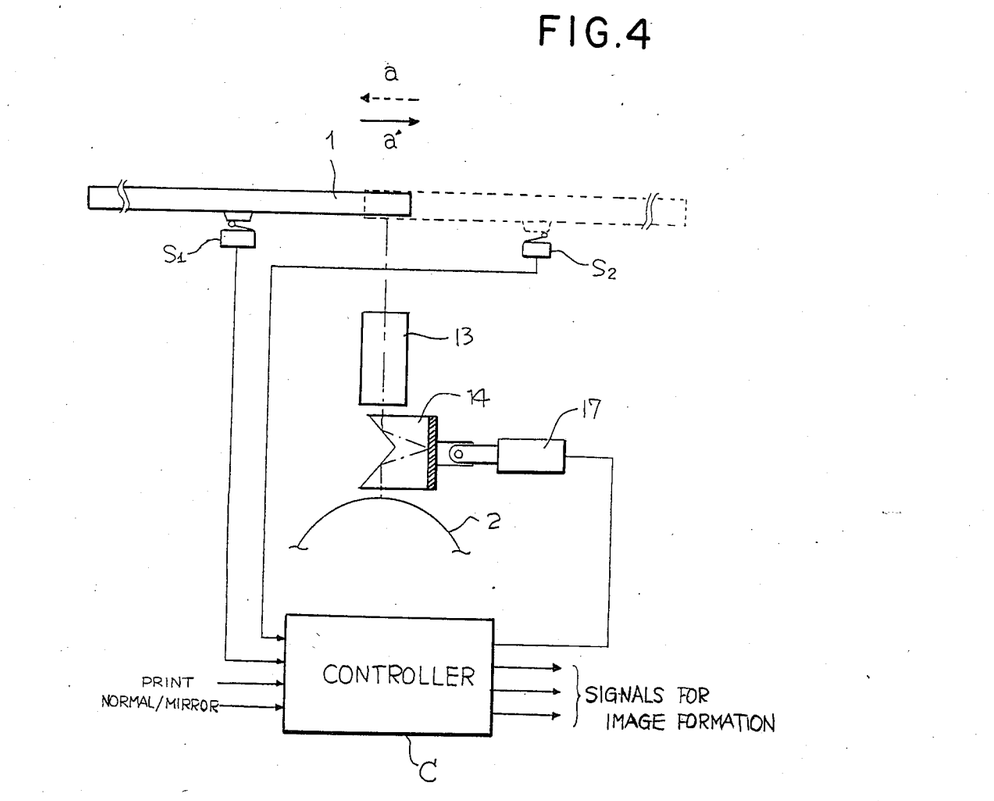
FIG. 4 is a diagram schematically showing an arrangement for effecting control according to the present invention.

The mode of controlling the present apparatus will be described briefly with reference to FIG. 4 since the present apparatus is controlled in the same manner as conventional copying machines except that the direction of travel of the glass platen 1 and image forming timing differ according to whether a normal image or a mirror image is to be formed. The control means C shown includes a microcomputer and receives a selection instruction as to whether a normal image or a mirror image is to be formed and a copying start instruction. These instructions are given by keys on an unillustrated panel. The control means C produces a control signal for turning on or off the solenoid to retract or advance the image inverting prism, and image formation control signals for a particular image, i.e., normal or mirror, for controlling exposure, charging, developing, transfer and like elements each with specified timing in accordance with the direction of travel of the glass platen.

Figure 5A:
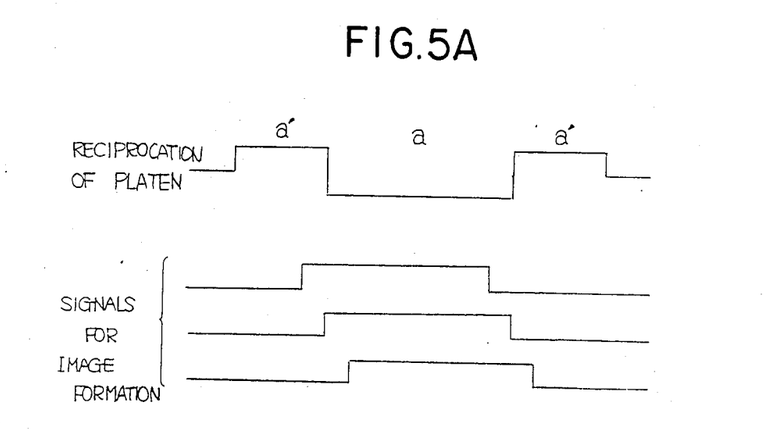
FIGS. 5a and 5b are control timing charts.
Figure 5B:
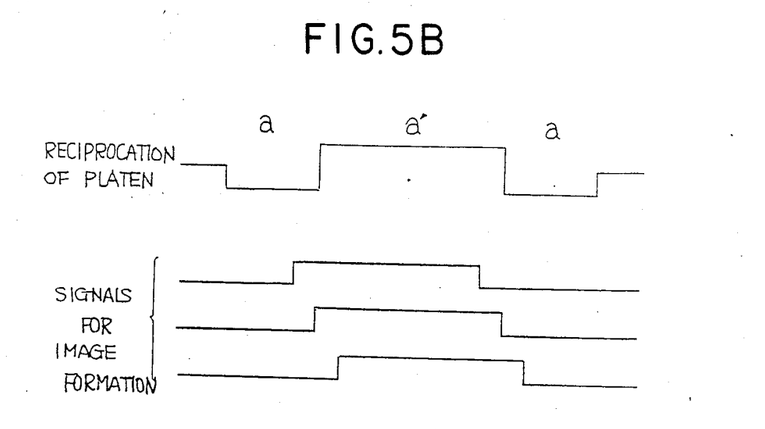

FIGS. 5a and 5b are timing charts showing the relation between the reciprocation of the glass platen and the image formation control signals. While in standby state, the glass platen is at rest in the center. From this position, the glass platen is first moved in the direction a to an exposure start position when a normal image is to be formed, or in the opposite direction a' to another exposure start position when a mirror image is to be formed. From the exposure start position, the platen is moved in the direction a' for making the normal image or in the direction a for the mirror image, and the image is formed in timed relation to the movement of the platen.

Next, examples of prisms useful for the present invention will be described in detail.

Figure 6:
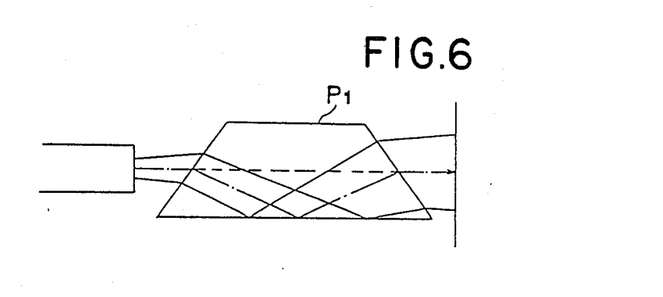
FIG. 6 is a diagram showing an example of image inverting prism usable in the invention but is not very desirable.
Figure 7:
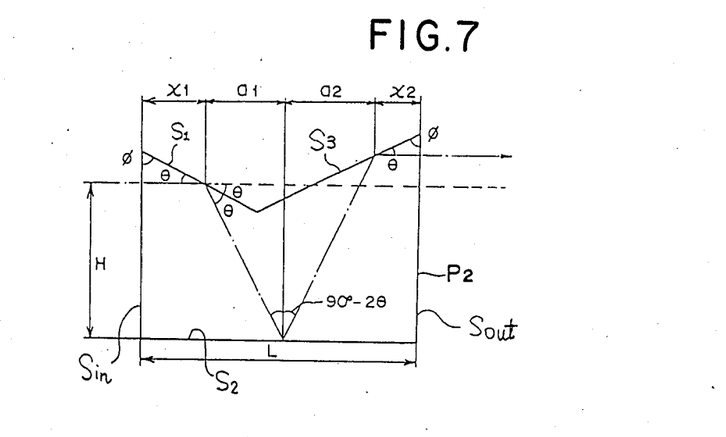
FIGS. 7 and 8 are diagrams showing image inverting prisms preferable for use in the invention.

Generally in image formation apparatus such as copying machines, mirror images can be obtained using a system wherein light is reflected an odd number of times. If such a system is to be obtained merely with use of a prism, a Dove prism P1 as shown in FIG. 6 may be useful. However, when the image transmission means used has a small focal depth like the light transmission array of the present invention, the prism produces astigmatism to deviate the image surface vertically or horizontally, failing to produce a focused image at a plane and adversely affecting the resolution and is, hence objectionable. FIG. 7 shows a prism P2 which is free of astigmatism and therefore desirable to use. The prism P2 has parallel plane end faces for the incidence and emergence of light and equal apex angles $\phi$ at its oppostie ends.

Rays are indicident on the surface of incidence Sin, reflected first at a first reflecting surface S1, then at a second reflecting surface S2 and thereafter at a third reflecting surface S3, and emerge from the surface of emergence Sout. The angle between the surface of incidence Sin and the first reflecting surface S1 and the angle between the surface of emergence Sout and the third reflecting surface S3 are the above-mentioned equal angles $\phi$. The second reflecting surface S2 is parallel with the incident and emergent optical axes of the prism.

Generally, when light passes through a substance having a refractive index of larger than 1, the optical path becomes shorter than otherwise. If the presence or absence of the prism in the optical path according to the invention produces a variation in the optical path length, the normal image or mirror image to be formed will be disturbed. The prism of FIG. 7 therefore needs to have the following relation for the optical path length of the present apparatus to remain unchanged when the prism is inserted into or removed from the path.

$$(x1 + x2 + a1 + a2)/Na = [x1 + x2 + (a1 + a2)/\cos 2\theta]/N \quad (1)$$

wherein
  Na: refractive index of air
  N: refractive index of the medium of prism Further for the position of the optical axis to remain unchanged, the height H of the prism from its bottom surface to the optical axis is to be so determined as to fulfill the following requirement:

$$a1 = a2 = a \quad (2)$$

Figure 8:
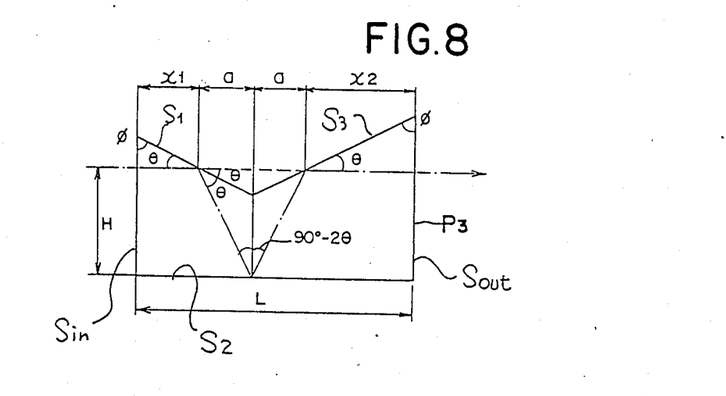

When the requirement (2) is fulfilled, the position of the optical axis remains unchanged irrespective of whether the prism is shaped symmetrically or asymmetrically. FIG. 8 shows a prism P3 meeting this requirement.

A design example of prism P3 will be shown below. In this example, the prism is shaped asymmetrically in view of the spread of bundle of rays.
Material: BK 7 (refractive index: 1.5168)
$\phi$: 60 deg
L: 15 mm
a: 3.88 mm
H: 8.81 mm
x1: 2.42 mm
x2: 4.82 mm When such a prism P3 is used, normal images or mirror images can of course be formed selectively, while the image surface can be held at a constant distance from the object surface, with the optical axis in a definite position, irrespective of the presence or absence of the prism in the optical path. Moreover, the use of the prism entails no astigmatism, assuring formation of satisfactory images.

According to the present invention, the image inverting prism 14 may be provided between the glass platen 1 and the array 13.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image formation apparatus capable of producing both mirror images and normal images comprising;
   a reciprocatingly movable platen for placing an original thereon,
   a photosensitive member movable in one direction for forming an image of the original thereon,
   an image transmission device for transmitting the image of the original onto the photosensitive member,
   an image inverting prism positionable selectively in the optical path of the image transmission device or outside thereof, said prism being so shaped as to give the same optical path length when positioned in the optical path and when positioned otherwise, and
   control means for controlling the movement of the prism into or out of the optical path and reversing the direction of movement of the platen for image formation in accordance with the movement of the prism into or out of the optical path.

2. An image formation apparatus as claimed in claim 1, wherein the image transmission device is an array of minute lens elements.

3. An image formation apparatus as claimed in claim 2, wherein the array is an array of light transmission fibers of graded refractive indexes.

4. An image formation apparatus as claimed in claim 1 wherein the prism has a surface of incidence and a surface of exit which are vertical to the optical axis, first and third reflecting surfaces which are inclined with respect to the optical axis and a second reflecting surface parallel to the optical axis, wherein optical rays incident on the surface of incidence are reflected inside the prism at the first, second and third surfaces in the order mentioned and exit from the surface of exit.

5. An image formation apparatus as claimed in claim 4, wherein the angle between the surface of incidence and the first reflecting surface is equal to the angle between the surface of exit and the third reflecting surface.

6. An image formatin apparatus capable of producing both mirror images and normal images comprising:
   means for supporting an original;
   a photosensitive member for forming an image of the original thereon;
   an image transmission device for transmitting the image of the original to the photosensitive member;
   an image inverting prism movably mounted for selective insertion into the optical path of the image transmission device;
   means for moving the supporting means relative to the image transmission device;
   means for moving the prism; and
   control means for controlling the movement of the prism into or out of the optical path of the image transmission device and for controlling the direction of movement of the means for moving the supporting means in accordance with the movement of the prism into or out of the optical path, the supporting means moving in a first direction with the prism out of the optical path and a second direction with the prism in the optical path.

7. An image formation apparatus as claimed in claim 6, wherein the image transmission device is an array of lens elements.

8. An image formation apparatus as claimed in claim 6, wherein the array is an array of light trasmission optical fibers with graded refractive indexes.

9. An image formation apparatus as claimed in claim 6, wherein the prism has a surface of incidence and a surface of exit which are vertical to the optical axis, first and third reflecting surfaces which are inclined with respect to the optical axis and a second reflecting surface parallel to the optical axis, wherein optical rays incident on the surface of incidence are reflected inside the prism at the first, second and third surfaces in the order mentioned and exit from the surface of exit.

10. An image formation apparatus as claimed in claim 9, wherein the angle between the surface of incidence and the first reflecting surface is equal to the angle between the surface of exit and the third reflecting surface.

11. A photocopier apparatus capable of producing both mirror images and normal images on copies of an original comprising:
    means for supporting an original;
    an image recording member for forming an image of the original thereon;
    an image transmission device for transmitting the image of the original to the image recording member;
    an image inverting member movably mounted for selective insertion into the optical path of the image transmission device;
    displacing means for relatively displacing the supporting means relative to the image transmission device;
    means for moving the image inverting member; and
    control means for controlling the movement of the image inverting member into or out of the optical path of the image transmission device and for controlling the direction of movement of the displacing means in accordance with the movement of the image inverting member into or out of the optical path, the displacing means moving in a first direction with the image inverting member out of the optical path and a second direction with the image inverting member in the optical path.

12. The invention of claim 11, wherein the image inverting member is a prism and is configured to provide the same length of optical path between the image transmission device and the image recording member whether it is positioned in the optical path or not.

13. The invention of claim 12, wherein the prism has a surface of incidence and a surface of exit which are vertical to the optical axis, first and third reflecting surfaces which are inclined with respect to the optical axis and a second reflecting surface parallel to the optical axis, wherein optical rays incident on the surface of incidence are reflected inside the prism at the first, second and third surfaces in the order mentioned and exit from the surface of exit.

14. The invention of claim 13, wherein the angle between the surface of incidence and the first reflecting surface is equal to the angle between the surface of exit and the third reflecting surface.

15. The invention of claim 14, wherein the array is an array of light transmission optical fibers with graded refractive indexes.

16. The invention of claim 14, wherein the image transmission device is an array of lens elements.

* * * * *

UNITED STATES PATENT OFFICE
CERTIFICATE OF CORRECTION

Patent No. 4,674,856           Dated  6/23/88

Inventor(s) Haruhiro Hyodo and Masayuki Mino

It is certified that error appears in the above-identified patent and that said Letters Patent are hereby corrected as shown below:

Column 5, line 59, delete "formatin" and insert --formation--.

Column 6, line 17, delete "trasmission" and insert --transmission--.

Signed and Sealed this

Tenth Day of January, 1989

Attest:

DONALD J. QUIGG

*Attesting Officer*    *Commissioner of Patents and Trademarks*